United States Patent
Barber et al.

(10) Patent No.: US 6,869,060 B2
(45) Date of Patent: Mar. 22, 2005

(54) HYDRAULIC POPPET VALVE WITH FORCE FEEDBACK

(75) Inventors: Dennis R. Barber, Oconomowoc, WI (US); Michael J. Paik, Delafield, WI (US)

(73) Assignee: HUSCO International, Inc., Waukesha, WI (US)

( * ) Notice: Subject to any disclaimer, the term of this patent is extended or adjusted under 35 U.S.C. 154(b) by 108 days.

(21) Appl. No.: 10/407,340

(22) Filed: Apr. 4, 2003

(65) Prior Publication Data

US 2004/0195532 A1 Oct. 7, 2004

(51) Int. Cl.$^7$ ............................................. F16K 31/02
(52) U.S. Cl. ............................. 251/30.02; 251/129.15
(58) Field of Search ....................... 251/30.02, 129.15, 251/33, 43, 44

(56) References Cited

U.S. PATENT DOCUMENTS

| | | |
|---|---|---|
| 5,072,752 A | 12/1991 | Kolchinsky |
| 5,878,647 A | 3/1999 | Wilke et al. |
| 5,921,279 A | 7/1999 | Barber |
| 6,328,275 B1 * | 12/2001 | Yang et al. ............... 251/30.03 |
| 6,330,798 B1 * | 12/2001 | Stephenson .................. 60/424 |

FOREIGN PATENT DOCUMENTS

EP          0 204 666          12/1986

* cited by examiner

Primary Examiner—Edward K. Look
Assistant Examiner—John K. Fristoe, Jr.
(74) Attorney, Agent, or Firm—George E. Haas; Quarles & Brady LLP

(57) ABSTRACT

A pilot operated valve has a poppet that is held against a valve seat by pressure in a control chamber on an opposite side of the poppet and by force from a feedback spring. The force feedback spring also engages a pilot valve spool which controls the flow fluid from a control chamber. When an electrically driven actuator moves the pilot valve spool and fluid is released from the control chamber, inlet pressure acting on the poppet causes the valve to open. As the poppet moves away from the valve seat, the feedback spring exerts more force on the pilot valve spool so as to meter the fluid being released from the control chamber. When the force of the feedback spring counterbalances the actuator force, an equilibrium condition occurs and the poppet stops moving at the desired flow control position.

20 Claims, 2 Drawing Sheets

HYDRAULIC POPPET VALVE WITH FORCE FEEDBACK

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to pilot operated hydraulic poppet valves; and more particularly to electrically operated pilot valves with a force feedback mechanism.

2. Description of the Related Art

Agricultural tractors and other types of hydraulically operated machinery commonly have components that are moved by a hydraulic actuator, such as a cylinder/piston arrangement. The piston slides within the cylinder and divides the cylinder interior into two chambers. By selectively applying hydraulic fluid under pressure to one chamber and draining hydraulic fluid from the other chamber, the piston can be forced to move in opposite directions within the cylinder. Such movement drives a rod connected between the piston and a component of the machinery.

Previously a manually operated valve assembly controlled the flow of fluid to and from the hydraulic actuator. Presently, there is a trend in agricultural equipment away from manual valves toward electrically operated valves. Electrical operation not only permits the valves to be located remotely from the operator position, but also enables computer control of the valves which allows more sophisticated functions to be provided. With electrical controls, the operator manipulates a joystick or other type of electrical input device to send signals to a microcomputer based controller, thereby indicating the desired movement of the associated components on the agricultural equipment. The controller interprets the electrical signals from the operator's input device and generates control signals which operate the hydraulic valves that control a hydraulic actuator which produces the desired motion.

A set of proportional solenoid valves, such as described in U.S. Pat. No. 5,878,647, can be used to control the flow of fluid to and from the hydraulic actuator. One solenoid valve is opened to supply pressurized fluid to the cylinder chamber on one side of the piston and another solenoid valve to exhaust fluid from the opposite cylinder chamber to a reservoir, or tank. By varying the degree to which the pair of solenoid valves are opened, the rate of flow into the associated cylinder chamber can be varied, thereby moving the piston at proportionally different speeds.

Solenoid operated pilot valves are well known for controlling the flow of hydraulic fluid and employ an electromagnetic coil which moves an armature in one direction to open a valve. The armature acts on a pilot valve element that opens and closes a pilot passage in a main valve poppet. Opening the pilot passage reduces pressure in a control chamber behind the main valve poppet which causes that poppet to move away from a valve seat, and allow fluid to flow through the valve.

With this type of pilot operated valve, the pilot valve element has to move the same distance as the main valve poppet is to move away from a valve seat. Therefore, if the maximum distance that the main valve poppet is to be able to open is five millimeters, the pilot valve element must be able to move five millimeters away from the main valve poppet in the closed state. If one desires to design a valve with a different maximum flow and thus movement of the main valve poppet, the pilot valve element often to be redesigned provide that movement. Therefore, it is desirable to produce valves with different flow characteristics without having to redesign most of its components.

SUMMARY OF THE INVENTION

A hydraulic valve includes a body that has a main bore with a first port, a second port and a valve seat there between. A poppet is slidably received in the main bore and defines a control chamber on a side of the poppet remote from the valve seat. The poppet has a control passage extending between the first port and the control chamber. A first branch passage is formed in either the body from the second port to an opening into the main bore. A pilot valve element slides in the main bore to control flow of fluid between the control chamber and the first branch passage. A feedback spring biases the poppet and the pilot valve element away from each other and biases the poppet into engagement with the valve seat. An electrically controlled actuator engages the pilot valve element to open and close communication between the control chamber and the first branch passage.

When the actuator moves the pilot valve element, pressure in the control chamber is released to the second port. This creates a pressure differential across the poppet so that greater pressure at the first port forces the poppet away from the valve seat thereby opening the valve. Movement of the poppet compresses the feedback spring applying a greater force to the pilot valve element which tends to close communication between the control chamber and the branch passage. When the feedback spring force equals the force applied to the pilot valve element by the actuator, the pilot valve element assumes a position at which it meters fluid flow from the control chamber to the second port. This metering maintains the existing pressure differential across the poppet, thus holding the position of the poppet and the existing flow rate through the valve. The force feedback mechanism of the present invention enables a relatively small amount of pilot valve element travel to produce a greater amount of poppet travel.

DETAILED DESCRIPTION OF THE INVENTION

Figure 1:
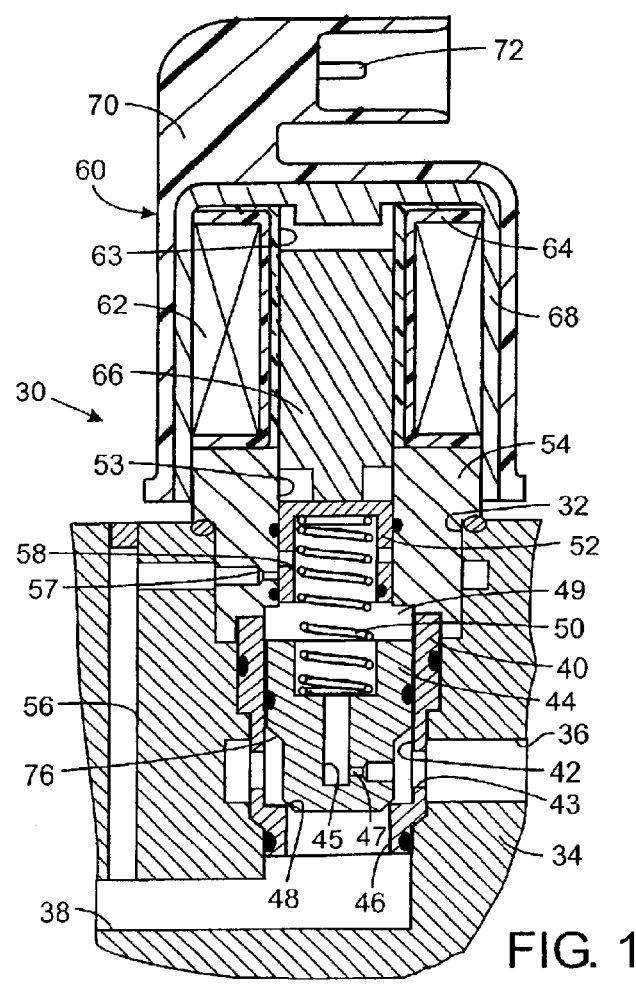
FIG. 1 is a cross sectional view through a first embodiment of a valve according to the present invention wherein the valve is in a closed state.

With reference to FIG. 1, an electrohydraulic, proportional control valve 30 is illustrated inserted into an aperture 32 in a valve body 34 which fluid flows between the supply and tank lines and a hydraulic actuator. The control valve 30 is unidirectional controlling the flow of fluid from an inlet passage 36 to and outlet passage 38 and may be employed to control fluid flowing to or from a hydraulic actuator.

The control valve 30 has a tubular sleeve 40 with a longitudinal bore 42 and transverse apertures which combined form an inlet port 43 into the longitudinal bore from the valve body inlet passage 36. The open end of the longitudinal bore 42 at the nose of the valve forms an outlet port 46 that communicates with the valve body outlet passage 38. A main valve poppet 44 is slidably received within the bore 42 of the sleeve 40 and moves with respect to a seat 48 located between the inlet apertures 43 and the outlet port 46. A feedback spring 50 biases the poppet 44 against the seat 48 to close the control valve 30. A control passage 45 with an orifice 47 extends through the poppet 44 connecting the inlet port 43 to a control chamber 49 on a remote side of the poppet from the valve seat 48.

The other end of the feedback spring 50 engages a pilot valve element, in the form of a cup-shaped, spool 52 that is slidably received in a bore 53 of a pilot body 54. The pilot body 54 is threaded into the aperture 32 in the valve body 34 and abuts the sleeve 40 to hold the latter component in the valve body aperture. The respective bores 42 and 53 in the tubular sleeve 40 and the pilot body 54 jointly form a main bore within the valve. A branch passage 56 extends from the outlet passage 38 through the valve body and the pilot body 54 and has branch orifice 57 opening into the bore 53 of the pilot body 54. The pilot valve spool 52 has a pilot aperture 58 extending transversely there through which moves into and out of communication with the branch orifice 57 as the pilot valve spool 52 slides in the bore 53.

The valve control 30 is operated by an electrical actuator 60 comprising a solenoid coil 62 wound on a non-magnetic bobbin 64, preferably formed of a plastic. The solenoid coil 62 is driven by a pulse width modulated (PWM) signal having a duty cycle that is varied to move the poppet 44 to a desired position in the valve body 40 as will be described. A copper or brass liner tube 63 extends within and along substantially the entire length of the bobbin 60. The liner tube 63 acts as a shading coil, which changes the input impedance characteristic of the solenoid coil 62 to be more like a resistor and less like an inductor. As a result, when a clamping type suppression diode in used in the electronic circuit that drives the solenoid coil 62, the liner tube 63 linearizes the relationship between the duty cycle of the PWM driving signal and the RMS current of that signal. This improves the controllability of the solenoid current and thus the position of the armature 66 and valve spool 44. A magnetically conductive pole cup 68 extends around the coil and bobbin assembly. The metal pilot body 54 closes the open end of the pole cup 68 completing the magnetic circuit of the actuator 60. The moveable armature 66 of the actuator 60 is able to slide within the bobbin 64. The armature 66 projects from the bobbin into the bore 53 of the pilot body 54 and abuts the pilot valve spool 52.

A plastic enclosure 70 is molded around the electric actuator 60 and projects outwardly there from. An electrical connector 72 is formed at the remote end of the projecting section of the enclosure 70. The electrical connector 72 has a pair of terminals which are connected to the solenoid coil 62 by wires (not visible). The control circuit that produces the PWM signal to drive the valve 30 is coupled to the electrical connector 72.

With continuing reference to FIG. 1 when the electrohydraulic control valve 30 is not being activated by electric current applied to the solenoid actuator 60, the feedback spring 50 forces the poppet 44 against the valve seat 48 closing off fluid flow between the inlet port 43 and outlet port 46. In this de-energized state, feedback spring 50 also pushes the pilot valve spool 52 upward in the drawing so that the pilot aperture 58 does not open into the branch orifice 57 leading to the outlet passage 38 in the valve body 34. Without a path between the control chamber 49 and the outlet passage 38, the pressure within the control chamber equals the pressure in at the inlet port 43 as applied through the poppet control passage 45. With those pressures equalized, the force from the feedback spring 50 prevents the poppet 44 from moving away from the valve seat 48 and maintains the valve 30 in the closed state.

References herein to directional relationships and movement, such as up and down, refer to the relationship and movement of the components in the orientation illustrated in the drawings, which may not be the orientation of the components as attached to machinery.

Figure 2:
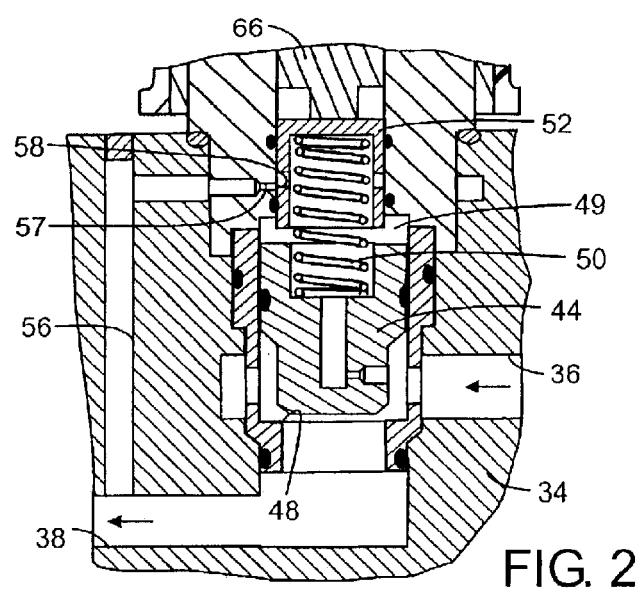
FIG. 2 is a cross sectional view of the fluid control section of the valve in an open state.

Referring to FIG. 2, application of electric current to the solenoid coil 62 causes the armature 66 to move downward. This motion pushes the pilot valve spool 52 downward so that its pilot aperture 58 communicates with the branch orifice 57, thereby opening a fluid path between the control chamber 49 and the valve body outlet passage 38. This vents the fluid from the control chamber 49 reducing the pressure therein below that at the inlet port 43. As a result, the greater inlet port pressure acting on annular surface 76 of the poppet 44 overcomes the feedback spring force and moves the poppet away from the valve seat 48. Thus the valve 30 opens.

Movement of the poppet 44 compresses the feedback spring 50 which increases the force applied by that spring to the pilot valve spool 52 and the armature 66. As that spring force increases the pilot valve spool 52 and the armature 66 move toward the solenoid coil which decreases the size of the opening between the branch orifice 57 and pilot aperture 58. Eventually the spring force counter balances the force produced by the solenoid actuator 60 at which point the poppet 44 and the pilot valve spool 52 stop moving. In that equilibrium position, the size of the opening between the pilot aperture 58 in the pilot valve spool and the branch orifice 57 in the pilot body creates a pressure differential across the poppet that maintains the poppet in position at which the desires fluid flow occurs through the valve 30.

Thus in order to open the valve, the pilot valve spool 52 needs to move only a relatively small distance that is sufficient to open communication between the pilot aperture 58 and the branch orifice 57. That relative small motion is able to produce a much greater movement of the poppet 44 with the relationship of the distances that these two components move being a function of the feedback spring force. As a consequence, that motion relationship can be altered by varying the feedback spring force. In other words the, poppet 44 can be configured to move farther for the same movement of the pilot valve spool 52 by inserting a weaker feedback spring 50. Similarly using a strong feedback spring 50 decreases the distance that the poppet 44 moves for a given amount of pilot valve spool 52 motion.

To close the valve, the solenoid coil in de-energized which causes the armature to retract into the bobbin due to the force of the feedback spring 50. Retraction of the armature results in the pilot valve spool moving into the position depicted in FIG. 1 where the pilot aperture 58 no longer opens into the branch orifice 57. Thus the control chamber 49 is closed off from the branch passage 56 that connects to the outlet passage 38. This causes pressure in the control chamber 49 to rise to the pressure at the inlet port 43, due to the connection through the control passage 45 in the poppet. Thus the pressure in the control chamber 49 becomes equal to the pressure acting on poppet surface 76 which allows the additional force of the feedback spring to move the poppet 44 against the valve seat 48 closing the valve 30.

Although the valve 30 is satisfactory for many applications, in the closed state of the valve depicted in FIG. 1, a certain amount of leakage occurs between the pilot aperture 58 in the pilot valve spool 52 and the adjacent branch orifice 57. That leakage path permits fluid to flow from the inlet port 43 through control passage 45 and into the control chamber 49 from which the fluid then leaks between the pilot aperture 58 and branch orifice 57 and onward through the branch passage 56 into the outlet passage 38. Such leakage occurs in spite of precision machining the bore 53 in the pilot body 54 and the exterior surface of the pilot valve spool 52. This amount of leakage may not be tolerable in some applications of the present force feedback valve.

Figure 3:
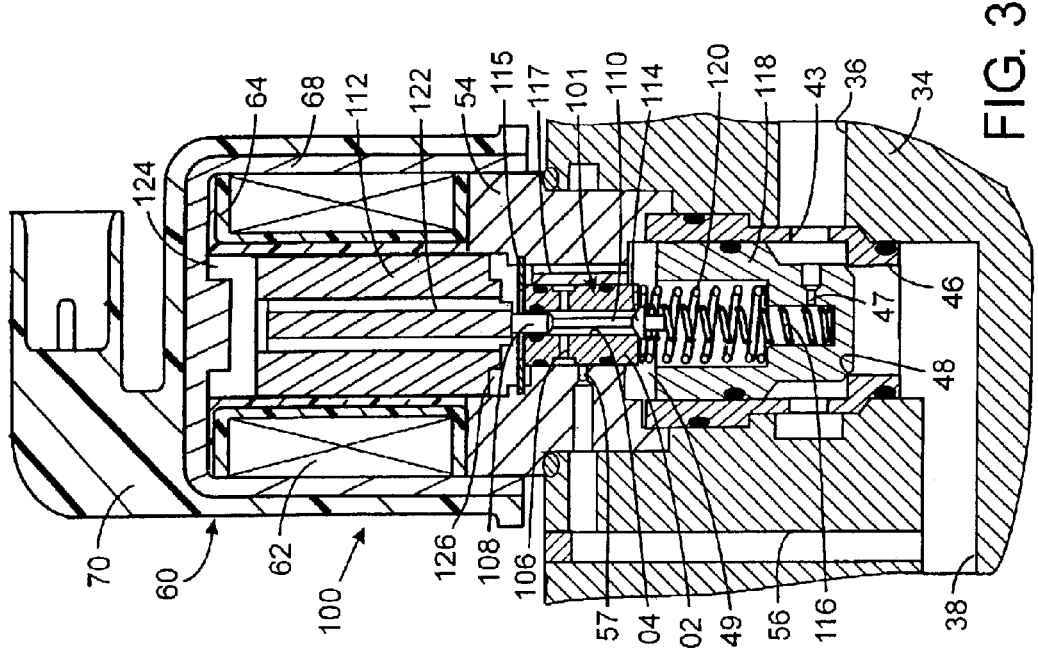
FIG. 3 is a cross sectional view through a second embodiment of a valve that has a low closed state leakage design.

FIG. 3 illustrates an alternative valve 100 which employs a reduced leakage pilot valve 101. Other components of the valve 100, which are identical to corresponding components of valve 30 in FIG. 1, have been assigned the same numerals.

The pilot valve 101 includes a cylindrically shaped spool 102 with a central bore 104 extending there through. The pilot aperture 106 provides a passage between the central bore 104 and the branch orifice 57 in the pilot body 54 when the pilot valve spool is properly positioned, as will be described. A closure stem 108 is received within the bore 104 of the pilot valve spool 102. The closure spool has a central portion 110, with a reduced diameter to provide a passage within the bore 104. One end of the closure stem 108 projects from the pilot valve spool 102 abutting the armature 112 of the solenoid actuator 60. The other end of the closure stem 108 projects from the opposite end of the pilot valve spool 102 and has a conical-shaped portion 114 which closes that end of the central bore 104 in the closed state of the valve, as illustrated. A bias spring 116 engages the conical-shaped portion 114 and the bottom of a bore within the main valve poppet 118 to bias the closure spool 102 against the end of the pilot valve spool. The force feedback spring 120 also extends between the bore of the valve poppet 118 and the adjacent end of the pilot valve spool 102. A snap ring 115 located across the bore within the pilot valve body 54 provides a stop that limits the travel of the pilot valve spool 102 toward the solenoid actuator 60.

The cylindrical armature 112 of the solenoid actuator 60 is slidably received within the bobbin 64 about which the solenoid coil 62 is wound. The armature 112 has several longitudinal apertures 122 which provide a path for fluid to flow between chambers 124 and 126 on opposite sides of the armature. The passages 122 ensure that the pressure will be equal on opposite sides of the armature so that its movement will not be impeded. The pilot valve body 54 also has a pressure relief passage 117 extending between the control chamber 49 and the chamber 126 between the armature and the pilot valve spool 102. The passage 117 ensures that the pressure on opposite sides of the pilot valve spool 102 will be equal so that its motion will not be affected by a pressure differential.

From the closed valve state illustrated in FIG. 3, the application of electricity to the solenoid coil 62 creates an electromagnetic field which drives the armature 112 toward the pilot valve spool 102. This motion forces the closure stem 108 downward in the orientation of the valve 100 in FIG. 3. This pushes the conical section 114 of the closure spool away from the end of the pilot valve spool 102, opening the spool bore 104 into the control chamber 49. Fluid from the control chamber now is available to enter the spool bore 104. Further downward motion of the armature 112 ultimately engages the pilot valve spool 102 so that the armature directly pushes the pilot valve spool 102 farther toward the poppet 118. As the pilot valve spool 102 continues to move, its pilot aperture 106 begins to open into the branch orifice 57, thereby providing communication between the control chamber 49 and the outlet passage 38 via the branch passage 56. This creates a fluid path which reduces the pressure within the control chamber 49. Because of the inlet orifice 47 in the poppet, the pressure within the control chamber 49 now is less than the pressure at the inlet port 43, thereby causing the poppet to move away from the valve seat 48, and opening the valve 100.

As the poppet moves, the force exerted on the pilot valve spool 102 by the feedback spring 120 increases. When that spring force reaches equilibrium with the force from the solenoid actuator 60, the pilot valve spool 102 stops moving. At this time, the pressure differential produced across the poppet 118 by the flow of fluid from the control chamber 49 through the outlet passage 38 due to the partial alignment of the pilot aperture 106 and branch orifice 57, maintains the position of the poppet.

In the closed state of the valve, the engagement of the conical section 114 of the closure stem 108 prevents fluid at the supply pressure within the control chamber 49 from entering the bore 104 in that valve element. The interface between the conical portion and the pilot valve spool 102 provides a relatively low leakage closure, as compared to the level of leakage occurring in the FIG. 1 embodiment between the pilot aperture 58 and the branch orifice 57. Leakage between the corresponding pilot aperture 106 and the branch passage 56 does not occur in valve 100 because pressurized fluid from the control chamber 49 cannot reach the pilot aperture in the closed state of the valve.

Closure of valve 100 occurs in a similar fashion to that described with respect to the previous embodiment. Briefly, removal of electric power to the solenoid coil 62, allows the force from the feedback spring 120 to push the pilot valve spool 102 upward so that the pilot aperture 106 no longer communicates with the branch orifice 57. This terminates the flow of fluid from the control chamber 49 through the branch passage 56 to the outlet passage 38. Thus, the pressure within the control chamber 49 increases to the pressure level at the inlet port 43 due to the path through the pilot control orifice 47. When the pressure on both sides of the poppet 118 equalizes, the feedback spring force causes the poppet to engage the valve seat 48, closing the valve 100. The force of the bias spring 116 at this time also forces the conical section 114 of the closure stem 108 against the open end of the bore 104 in the pilot valve spool 102, thereby closing that open end and returning the valve to the configuration illustrated in FIG. 3.

Figure 4:
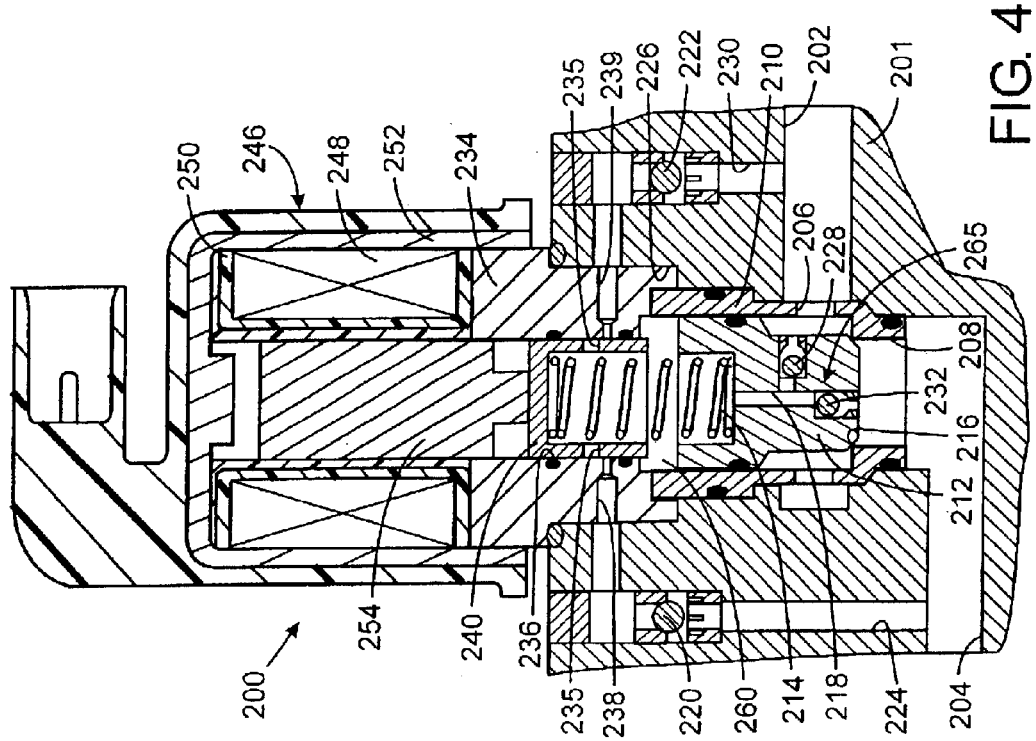
FIG. 4 is a cross sectional view through a bidirectional valve according to the present invention.

Both of the previous embodiments were unidirectional valves, in that the flow of fluid is proportionally controlled in only from the inlet port 43 to the outlet port 46. FIG. 4 illustrates a bidirectional valve 200 according to the present invention, that proportionally controls fluid flow in either direction. Specifically, the valve body 201 has first and second passages 202 and 204 which open into an aperture 226 within which the valve 200 is received to controlling the flow of fluid between those passages. A first branch passage 224 extends in the valve body 201 between the second passage 204 and the aperture 226 and has a first check valve 220 that allows fluid to flow only in a direction from that aperture to the second passage. A second branch passage 230 in the valve body 201 extends between the first passage 202 and the aperture 226. A second check valve 222 allows fluid to flow through the second branch passage 230 only from the aperture to the first passage 202.

The valve 200 has a tubular sleeve 210 with a first port 206 that provides a path between the first passage 202 of the valve body and a central bore of the valve. A poppet 212 is slidably received in that central bore and is normally biased by a feedback spring 214 against a valve seat 216, thereby closing communication between the first port 206 and a second port 208. The poppet 212 has a control passage 218 with a third check valve 228 that allows fluid to flow only from the first port 206 through the control passage 218 to a control chamber 260 on a remote side of the poppet from the valve seat 216. A fourth check valve 232 in the poppet 212 permits fluid flow only from the second port 208 through the control passage 218 to the control chamber 260. The third and fourth check valves 228 and 232 form a valve arrangement 265 which allows fluid to flow through the control passage 218 only in a direction from one of the first and second passages 202 or 204 to the control chamber 260. Alternatively a shuttle valve can be used as this valve arrangement 265, in place of the third and fourth check valves 228 and 232, in which case the shuttle valve transmits the greater pressure at either the first or second passage 202 or 204 to the control chamber 260.

A pilot body 234 is located within the aperture 226 and engages the tubular sleeve 210 to hold that latter component within the valve body 201. The pilot body 234 has a central pilot bore 236 with a first branch aperture 238 that extends the first branch passage 238 to the pilot bore 236. A second branch aperture 239 extends the second branch passage 230 through the pilot body 234 to the pilot bore 236. A cup-shaped spool 240 forms the pilot valve element and is slidably received within the pilot bore 236. The pilot spool 240 has a plurality of pilot apertures 235 there through. The end of the feedback spring 214 that is remote from the poppet 212, engages the pilot valve spool 240.

A linear actuator 246 has a solenoid coil 248 wound within a non-magnetic bobbin 250 which is held within a magnetically conductive pole cup 252 that engages the pilot body 234. An armature 254 is slidably received within the bobbin and engages the outer surface of the pilot valve spool 240. The electric current generates an electromagnetic field which extends the armature 254 from the solenoid coil 248 toward the main valve poppet 212. The magnitude of that electric current determines distance that the armature 254 extends from the solenoid coil 248 and thus the amount that the valve opens for proportionally controlling the fluid flow between the first and second ports 202 and 204, as will be described.

In the de-energized state of the solenoid coil 248, the feedback spring 214 forces the pilot valve spool 240 against the armature 254. In that position of the pilot valve spool 240, the control chamber 260 is closed off from both the first and second branch passages 224 and 230. Thus the greater pressure at either the first and second valve body passages 202 and 204 is applied by the third or fourth check valve 220 or 222 to the control chamber 260. With the same high pressure existing on both sides of the poppet 212, the additional force of the feedback spring 214 holds the poppet against the valve seat 216.

Assume that the pressure at the first passage 202 exceeds the pressure at the second passage 204, that higher pressure is communicated to the control chamber 260 through the third check valve 228 and the poppet control passage 218. When solenoid actuator 246 drives the armature 254 to push the pilot valve spool 240 toward the poppet 212, one of the pilot apertures 235 opens into the first branch aperture 238 in the pilot body 234. This creates a path through which pressure in the control chamber 260 is relieved via the first check valve 220 and the first branch passage 224 to the second passage 204. Thus pressure in the control chamber 260 becomes less than that in at the first passage 202. Note that the greater pressure in the first passage 202 closes the second check valve 222 in the second branch passage 230. The fourth check valve 232 also remains closed.

With pressure in the control chamber 260 relieved, the pressure from the first passage 202 forces the poppet 212 away from the valve seat 216 opening direct fluid flow from the first passage to the second passage 204. Movement of the poppet 212 continues until the pressure force balances the force from the feedback spring 214. At that equilibrium condition, the orifice formed between pilot aperture 235 and the first branch aperture 238 maintains a pressure differential across the poppet 212 which holds the valve open the proper amount to achieve the desired amount of fluid flow.

Alternatively when pressure at the second passage 204 is greater than the pressure at the first passage 202, the higher pressure is communicated to the control chamber 260 through the fourth check valve 232. Now, when the solenoid actuator 246 moves the pilot valve spool 240 so that a pilot aperture 235 opens into the second branch aperture 239 in the pilot body, pressure is released from control chamber 260 through the second check valve 222 and the second branch passage 230 to the first passage 202. The first and third check valves 220 and 228 are closed. With the control chamber pressure relieved, pressure from the second passage 204 forces the poppet 212 away from the valve seat 216 opening direct path for fluid to flow from the higher pressure second passage 204 to the first passage 202.

Movement of the poppet 212 continues until the fluid pressure balances the force from the feedback spring 214. At that equilibrium condition that orifice formed between pilot aperture 235 and the second branch aperture 239 maintains a pressure differential across the poppet 212 which holds the valve open the proper amount to achieve the desired amount of fluid flow.

The foregoing description was primarily directed to preferred embodiments of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A hydraulic valve comprising:
 a body having a main bore with a first port, a second port and a valve seat there between, the first body has a first branch passage extending from the second port to the main bore;
 a poppet slidably received in the main bore and defining a control chamber on a side of the poppet remote from the valve seat;
 one of the body and the poppet having a control passage extending between the first port and the control chamber;
 a pilot valve element slidably received in the main bore and spaced from the poppet to control flow of fluid between the control chamber and the first branch passage;

a feedback spring extending between the poppet and the pilot valve element and biasing the poppet into engagement with the valve seat; and an electrically controlled actuator engaging the pilot valve element to open and close communication between the control chamber and the first branch passage.

2. The hydraulic valve as recited in claim 1 wherein the pilot valve element is a spool having a pilot bore that opens into the control chamber, the spool has a pilot aperture between the pilot bore and an exterior surface of the spool, wherein the pilot aperture communicates with the first branch passage in certain positions of the spool with in the main bore.

3. The hydraulic valve as recited in claim 1 wherein the pilot valve element is a spool having a pilot bore extending there through and forming a pilot seat, a pilot aperture extends between the pilot bore and an exterior surface of the spool, and a closure stem is within the pilot bore, the pilot valve element includes a pilot spring biasing the closure stem into engagement with the pilot seat to close the pilot bore, wherein the electrically controlled actuator applies force to the pilot valve element which moves the closure stem away from the pilot seat.

4. The hydraulic valve as recited in claim 3 wherein the pilot spring engages the poppet.

5. The hydraulic valve as recited in claim 3 wherein the pilot seat is formed at a opening of the pilot bore at an exterior surface of the pilot spool, and the closure stem projects through the opening and has a conical portion which selectively engages the pilot seat.

6. The hydraulic valve as recited in claim 1 wherein the electrically controlled actuator comprises a solenoid coil and an armature that engages the pilot valve element.

7. The hydraulic valve as recited in claim 1 further comprising:

the body having a second branch passage extending from the first port to the main bore, wherein the pilot valve element controls flow of fluid between the control chamber and the second branch passage;

a first check valve limiting flow through the first branch passage to only a direction from the control chamber to the second port;

a second check valve limiting flow through the second branch passage to only a direction from the control chamber to the first port; and a valve arrangement which applies the greater pressure at the first port and the second port to the control chamber.

8. The hydraulic valve as recited in claim 1 further comprising:

a second branch passage in the body extending from the first port to the main bore, wherein the pilot valve element controls flow of fluid between the control chamber and the second branch passage;

a first check valve limiting flow through the first branch passage to only a direction from the control chamber to the second port;

a second check valve limiting flow through the second branch passage to only a direction from the control chamber to the first port;

the control passage also communicating with the second port;

a third check valve associated with the control passage to limit flow to only a direction from first port into the control chamber; and a fourth check valve associated with the control passage to limit flow to only a direction from the second port into the control chamber.

9. The hydraulic valve as recited in claim 1 wherein the feedback spring abuts both the poppet and the pilot valve element.

10. A hydraulic valve comprising:

a body having a main bore with an inlet port, an outlet port and a valve seat there between, the body further having a branch passage extending from the outlet port to an opening into the main bore;

a poppet slidably received in the main bore and defining a control chamber in the main bore on a side of the poppet remote from the valve seat, the poppet having a control passage extending between the inlet port and the control chamber;

a pilot valve slidably received in the main bore and controlling flow of fluid between the control chamber and the first branch passage;

a feedback spring biasing the poppet and the pilot valve away from each other and biasing the poppet into engagement with the valve seat; and an electrically operated, linear actuator engaging the pilot valve to open and close communication between the control chamber and the first branch passage.

11. The hydraulic valve as recited in claim 10 wherein the pilot valve is a spool having a pilot bore that opens into the control chamber and has a pilot aperture between the pilot bore and an exterior surface of the spool, wherein the pilot aperture communicates with the branch passage in certain positions of the spool within the main bore.

12. The hydraulic valve as recited in claim 10 wherein the pilot valve comprises:

a spool having a pilot bore extending there through and forming a pilot seat and a pilot aperture between the pilot bore and an exterior surface of the spool;

a closure stem within the pilot bore; and a pilot spring biasing the closure stem into engagement with the pilot seat to close the pilot bore, wherein the linear actuator applies force to the pilot valve which moves the closure stem away from the pilot seat.

13. The hydraulic valve as recited in claim 12 wherein the pilot spring engages the poppet.

14. The hydraulic valve as recited in claim 12 wherein the pilot seat is formed at a opening of the pilot bore at an exterior surface of the pilot spool, and the closure stem projects through the opening and has a conical portion which selectively engages the pilot seat.

15. The hydraulic valve as recited in claim 10 wherein the electrically controlled actuator comprises a solenoid coil and an armature that engages the pilot valve.

16. The hydraulic valve as recited in claim 10 wherein the feedback spring abuts both the poppet and the pilot valve element.

17. A hydraulic valve comprising:

a body having a main bore with a first port, a second port and a valve seat there between, the body further having a first branch passage extending from the second port to the main bore and a second branch passage extending from the first port to the main bore;

a poppet slidably received in the main bore and defining a control chamber in the main bore on a side of the poppet remote from the valve seat, the poppet having a control passage extending between the first port, the second port and the control chamber;

a pilot valve element slidably received in the main bore and controlling flow of fluid between the control chamber and each of the first branch passage and the second branch passage;

a first check valve limiting flow through the first branch passage to only a direction from the control chamber to the second port;

a second check valve limiting flow through the second branch passage to only a direction from the control chamber to the first port;

a third check valve limiting flow to only a direction from first port into the control passage;

a fourth check valve limiting flow to only a direction from second port into the control passage;

a feedback spring biasing the poppet and the pilot valve element away from each other and biasing the poppet into engagement with the valve seat; and an electrically operated, linear actuator engaging the pilot valve element to open and close communication between the control chamber and both the first branch passage and the second branch passage.

18. The hydraulic valve as recited in claim 17 wherein the pilot valve element comprises a spool having a pilot bore that opens into the control chamber and a passageway between the pilot bore and an exterior surface of the spool, wherein the passageway communicates with the first branch passage and the second branch passage only in certain positions of the spool with in the main bore.

19. The hydraulic valve as recited in claim 18 wherein passageway is formed by a plurality of apertures in the spool.

20. The hydraulic valve as recited in claim 17 wherein the linear actuator comprises a solenoid coil and an armature that engages the pilot valve element.

* * * * *